United States Patent

Krupke

[15] 3,638,137

[45] Jan. 25, 1972

[54] METHOD OF Q-SWITCHING AND MODE LOCKING A LASER BEAM AND STRUCTURE

[72] Inventor: William F. Krupke, Los Angeles, Calif.
[73] Assignee: Hughes Aircraft Company, Culver City, Calif.
[22] Filed: Jan. 10, 1969
[21] Appl. No.: 791,212

[52] U.S. Cl..............................................331/94.5, 250/199
[51] Int. Cl.........................................H01s 3/11, H01s 3/10
[58] Field of Search.................................331/94.5; 250/199

[56] References Cited

OTHER PUBLICATIONS

Moore, " Gas Laser Frequency Selection by Molecular Absorbtion," Applied Optics, 4, (2), Feb. 1965, pp. 252– 3.
Wood et al., " Passive Q-Switching of a $CO_2$ Laser," App. Phys. Lett., Aug. 1, 1967, Vol. 11, 03, pp. 88– 9.
Hanst et al., " Repetitive Pulsing.... and other Absorbers," App. Phys. Lett., 12, (3), Feb. 1 1968, pp. 58– 61.
Karlov et al., " Q-Switching....Boron Tetrachlorise," JETP Letters, 7, (15), Mar. 5, 1968, pp. 134– 6.

Primary Examiner—Ronald L. Wibert
Attorney—James K. Haskell and Alton V. Oberholtzer

[57] ABSTRACT

The method of passively Q-switching and mode locking a multiwavelength laser to produce repetitive pulses of coherent radiation at a specific single wavelength using a mixture of gases, and a structural arrangement therefor.

2 Claims, 5 Drawing Figures

PATENTED JAN 25 1972

William F. Krupke,
INVENTOR.

BY.

*Alton V. Oberhelzer*

ATTORNEY.

William F. Krupke,
INVENTOR.

BY.

ATTORNEY.

METHOD OF Q-SWITCHING AND MODE LOCKING A LASER BEAM AND STRUCTURE

The invention herein described was made in the course of or under a contract or subcontract thereunder with the Air Force.

The invention relates to the discovery and improvement in a method of passively Q-switching and mode locking a multiwavelength laser with a multicomponent gas mixture. More particularly, the invention relates to providing a passive Q-switch and/or mode-locking element for a $CO_2$ laser to produce high repetition rate pulses of coherent radiation at 10.6 microns, while maintaining the same average power of the free-running laser, using a mixture of sulfur hexafluoride ($SF_6$) as a bleachable gas at 10.6 microns, and chlorotrifluoroethylene ($C_2F_3Cl$) as a selective suppressor of stimulated emission at undesired wavelengths.

PRIOR ART METHOD OF PASSIVE Q-SWITCHING AND MODe-LOCKING A $CO_2$ LASER

The best known prior art of passive Q-switching and/or mode locking a $CO_2$ laser is disclosed by Wood, et al., Appl. Phys. Letters, 11, 88 (1967) and Appl. Phys. Letters, 12, 263 (1968), in which passive switching and mode locking were obtained using sulfur hexafluoride gas and a dispersing prism in the resonator to suppress spurious oscillation of the $CO_2$ laser at wavelengths other than 10.6 microns. This method requires substantial aperturing of the resonator to achieve the required amount of spectral resolution for switching and mode locking and generally lowers the output power of the laser. The herein disclosed method does not have these drawbacks and may be used for passively Q-switching and mode locking high average power lasers.

SUBJECT OF PRESENT DISCLOSURE

It is an object of this invention, improvement and discovery to provide an improved method of producing high repetition rate pulses of coherent radiation in a multiwavelength laser by passive Q-switching and/or mode locking using a mixture of gases. One of the gases is a vapor which can be bleached at one of the operating wavelengths of the laser, say $\lambda_0$. The second gas serves the purpose of suppressing laser oscillation on operating wavelengths of the laser other than $\lambda_0$. More than a single suppressor gas may be required to suppress all of the undesired wavelengths. The suppressor gases must be essentially transparent at the wavelength $\lambda_0$ and spectrally lossy at the other operating wavelengths of the laser.

It is a further object of this invention, improvement and discovery to provide in particular, a method of passively Q-switching and mode locking a $CO_2$ laser with a nondispersive resonator using a mixture of $SF_6$ and $C_2F_3Cl$ gases in a common gas cell, placed within the resonator. The $C_2F_3Cl$ gas is the suppressor gas and suppresses oscillation at all wavelengths other than 10.6 microns by selective absorption. Repetitive bleaching of the $SF_6$ at 10.6 microns then ensures.

Further objects and advantages in employing multi-gas passive switching mixtures for molecular lasers as contemplated and embodied herein will be apparent from the further following description in conjunction with the drawings.

DETAILED DESCRIPTION

Figure 1:
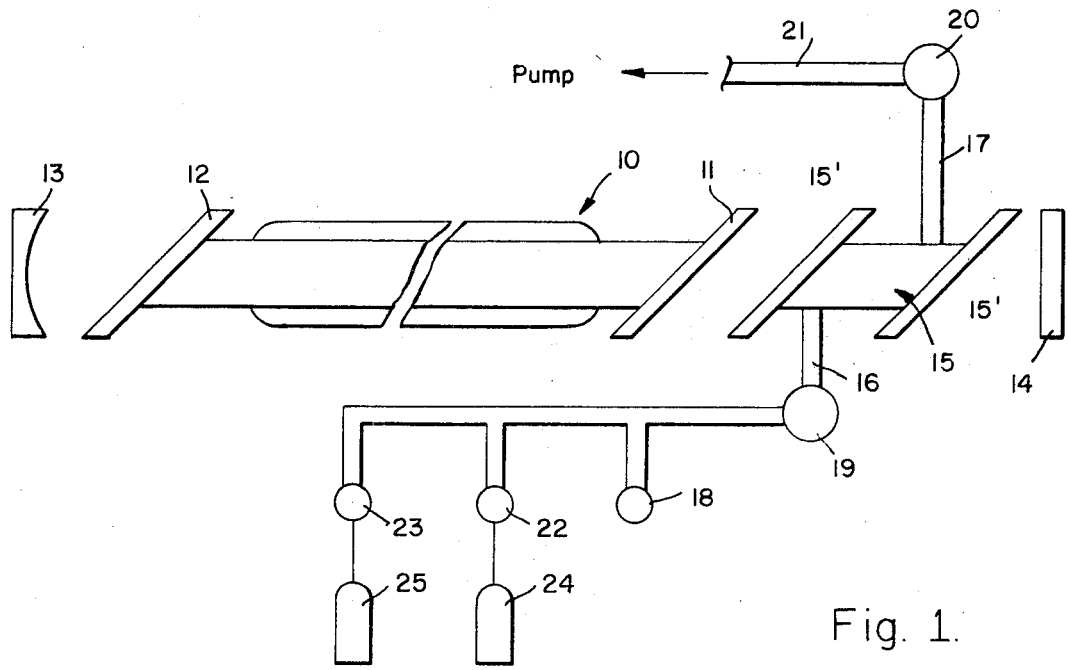
FIG. 1 shows a block diagram illustrative of the process of the method of passive Q-switching and mode locking of a $CO_2$ laser.

For radar, object illumination, signaling, light transmission, and other laser applications requiring selected high repetition rate pulses of coherent radiation or oscillation from a molecular laser, producing such selected and spurious oscillations, while free-running under the same average power, the following examples with the $CO_2$ laser tube 10 are illustrative. As diagrammatically illustrated in FIG. 1, this tube is a 2 meter long Pyrex tube 1.45 cm. in diameter, fitted with a water cooling jacket, and closed at each end with conventional salt windows 11 and 12 placed at Brewster's angle. The laser tube is powered with an alternating current neon sign transformer (not shown) delivering up to 60 ma. at 15 kv. The laser resonator for passive Q-switching alone consists of a spherical mirror 13 with a 5 meter radius of curvature, fully coated with gold. The output coupling mirror 14 is a barium fluoride flat coated with a quarter wave thick dielectric layer of ZnS, producing a reflectivity of 33 percent at 10.6 microns.

The gas switching cell 15 is a gastight, light-transmitting aluminum cylinder 2.5 cm. in diameter and 7.6 cm. long, with light-transmitting end windows. This cylinder can be prefabricated as an independent closed light-transmitting cell with a suitable enclosed gas mixture for a given laser and replaceably inserted into the resonator at the output end of the resonator. The cell 15 herein is a fixed transmission cell and is closed with salt windows 15' placed at Brewster's angle. In this instance, the cell was not sealed off, since runs of various mixtures of the bleachable and suppressor gases were being studied. Instead the cell 15 was fitted with gas inlet feed 16 and gas outlet conduit 17. A gas pressure gauge 18 was connected to the main feed line 16'. Mixed gas flow is controlled by regulator 19 in the feed conduit. The gas outlet 17 is connected through control valve 20 and conduit 21 to a suitable conventional exhaust pump (not shown).

The supply of bleachable and suppressor gases is provided by valved outlets 22 and 23 connecting containers 24 and 25 respectively to the gaseous feed line 16'. Cylinder 24 contains a bleachable gas as $SF_6$ and cylinder 25 contains a suppressant gas as chlorotrifluoroethylene. These gases, as illustrated, are contained in commercially available pressurized cylinders and are premixed in a desired ratio in feed line 16' (gas-handling manifold).

As indicated, the reference provides passive switching and mode-locking of a $CO_2$ laser with sulfur hexafluoride gas as the bleachable gas and a dispersing prism to suppress spurious oscillation at wavelengths other than 10.6 microns. Herein, the dispersing prism (or grating) is replaced with a cell containing a second gas, or gas mixture, with selective absorption which serves the purpose of suppressing spurious oscillations at wavelengths of radiation transmitted by the passive bleachable gas. In the case of the $CO_2$ laser, the gas $C_2F_3Cl$ has a unique selective absorption spectrum to absorb radiation at all wavelengths for which the $CO_2$ laser has net gain, except at 10.6 microns. Thereby, the absorption gas suppresses undesired oscillation and permits repetitive bleaching of the $SF_6$ gas at 10.6 microns.

While an appropriate or suitable bleachable and suppressor gas mixture may be prepared in an arbitrary ratio for laser transitions which have a net gain and which must be suppressed for passive switching and mode-locking at the desired wavelength, the conditions for the $CO_2$ laser for passive switching at 10.6 microns are as follows:

| | | |
|---|---|---|
| $00° 1 \rightarrow$ | $02°$ R-branch at | 9.2 microns |
| $00° 1 \rightarrow$ | $02°0$ P-branch at | 9.6 microns |
| $00° 1 \rightarrow$ | $10°0$ R-branch at 10.2 microns | |

Figure 2:
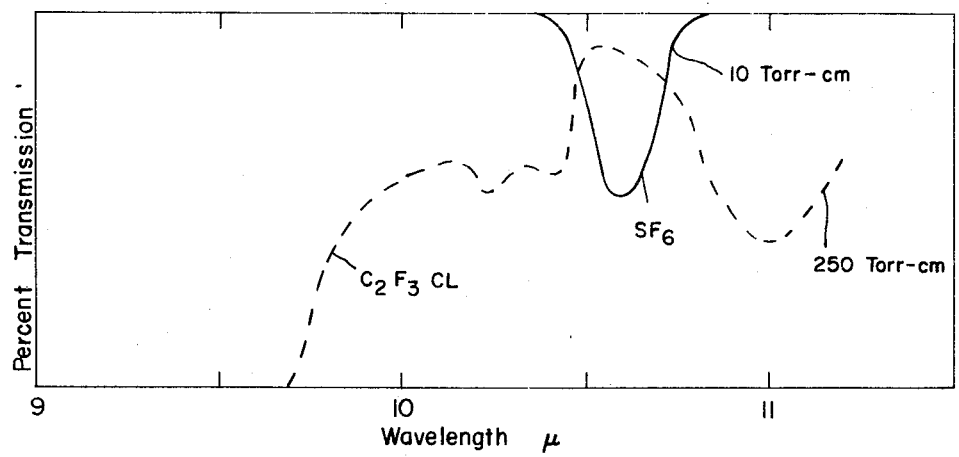
FIG. 2 shows the absorption spectra of the suppressor gas and bleachable gas, herein used in particular for the $CO_2$ laser.

As illustrated in FIG. 2, the suppressor gas has an intense absorption band spanning the region from 9.0 to 9.7 microns which suppress oscillation in the $00°1 \quad 02°0$ bands. This gas also has a weaker band extending from 9.7 to 10.4 microns of sufficient strength to suppress oscillations at 10.2 microns. This gas is essentially transparent at 10.6 microns, the wavelength at which optimum Q-switching and mode-locking is achieved with the bleaching gas (herein $SF_6$).

Passive Q-switching and mode-locking of the $CO_2$ laser output has been obtained with a cell containing a 20:1 mixture of suppressor ($C_2F_3Cl$) and switching ($SF_6$) gases, with a total pressure of 4 torr. replacing the conventional dispersing prism. This gas mixture produces the laser output shown in FIGS. 3 and 5. Other suitable gas mixtures in desired ratios may be utilized for effecting comparable results in laser outputs.

Figure 3:
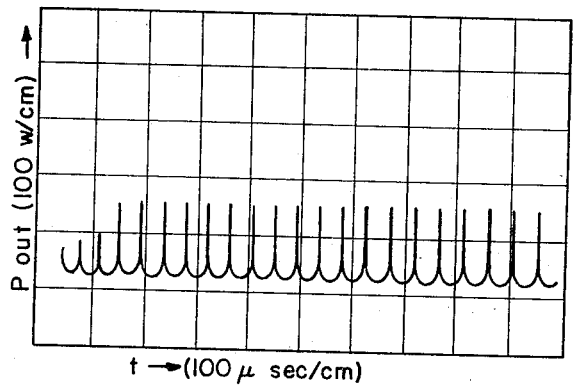
FIG. 3 shows a regular train of Q-switched pulses from the $CO_2$ laser with a mixture of switching and suppressor gases present in the cell.
Figure 4:
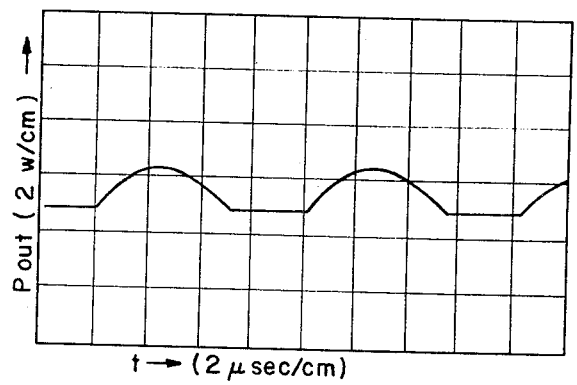
FIG. 4 shows the laser output waveform of a free-running electrically powered $CO_2$ laser utilizing the gas mixture as embodied herein.

When the average power of the laser was 1 watt with no gases present in the cell, the mode pattern was circular with a diameter of about 2mm. This provides a flux of about 60 w./cm.$^2$ which is sufficient to bleach the Q-switching gas. In the above arrangement, when only suppressor gas was used in the cell 15, no loss of laser power was observed for pressures up to 50 torr. When the Q-switching gas was used in the cell above, the wavelength of the laser output shifted to 9.6 microns, with no apparent loss of power. When the suppressor gas ($C_2F_3Cl$) switching gas ($SF_6$) were admitted or contained in the cell 15, in the ratio of 20:1, at a total pressure near 4 torr, the laser output broke into a series of intense pulses as shown in FIG. 3 and the average power decreased to 0.9 watts. The pulse repetition rate is 20 kHz. and the peak pulse power is about 180 watts. FIG. 4 is illustrative of a free-running laser output with the laser beam on one-half the running time operating under a power of 2w./cm. with a sweep time of 2 m. sec./cm.

Figure 5:
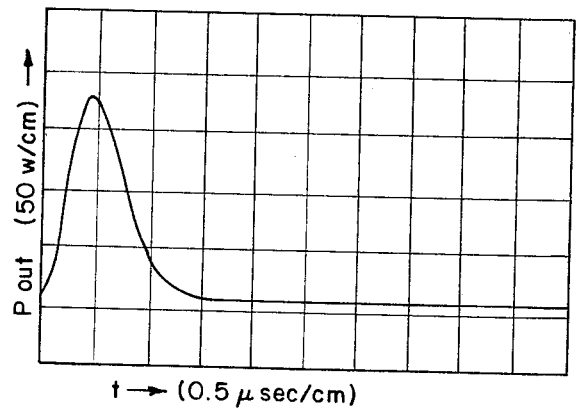
FIG. 5 shows a single Q-switched pulse with time resolution greater than used in FIG. 3.

Utilizing the switching and suppressor gas combination, as described in the 20:1 ratio, an individual Q-switched pulse is shown in FIG. 5 in greater resolution. The vertical scale factor is 50 watts/cm. and the sweep time is 0.5 microseconds. The width of the pulse at half power is about 0.5 microseconds. Using this pulse width and a peak power of 180 watts coupled with the fact that the laser is on one-half of the time, an average power of 0.9 watts is computed in accordance with the measured power.

Passive mode-locking of a $CO_2$ laser has also been achieved using $SF_6+C_2F_3Cl$ gases. In this case, the laser tube had 4.3 meters of discharge, and the laser resonator was 15 meters long. This length resonator has an axial mode spacing of 10 mHz. and has fine axial modes within the 50 mHz. Doppler linewidth of the $CO_2$ molecules. Pulses at a rate of $10^7$ sec$^{-1}$ was obtained with a mixture of $SF_6+C_2F_3Cl$ gases present in the sample cell.

Illustrative of other dual gas passive switching mixtures for the same and other molecular lasers are the following:

| Laser Gas | Q-switched Wavelength ($\mu$) | Suppressor Gas | Switching Gas |
|---|---|---|---|
| $CO_2$ | 10.6 | $C_2F_3Cl$ | $SF_6$ |
| $CO_2$ | 10.6 | $C_2F_3Cl$ | $BCl_3$ |
| $CO_2$ | 10.6 | $C_2F_3Cl$ | $CH_3:CF_2H$ |
| $CO_2$ | 10.6 | $CF_2:CCl_2$ | $SF_6$ |
| $CO_2$ | 10.6 | $CF_2:CCl_2$ | $BCl_3$ |
| $CO_2$ | 10.6 | $C_2F_3Cl$ | $CH_2:CF_2$ |
| $CO_2$ | 10.6 | $CF_2:CCl_2$ | $CH_2:CF_2H$ |
| $CO_2$ | 10.6 | $CF_2:CCl_2$ | $CH_2:CF_2$ |
| $CO_2$ | 9.6 | $CH_3:CF_2Cl$ | $C_2F_3Cl$ |
| $N_2O$ | 10.5 | $C_2F_3Cl$ | $BCl_3$ |
| $N_2O$ | 9.6 | $CH_3:CF_2Cl$ | $C_2F_3Cl$ |

In the case of the $N_2O$ laser the vibrational bands which may exhibit net gain are:

| | |
|---|---|
| P-branch 00° 1 → 10° 0 | 10.8 microns |
| R-branch 00° 1 → 10° 0 | 10.5 microns |
| P-branch 00°0 1 → 02° o | 9.6 microns |
| R-branch 00° 1 → 02° 0 | 9.3 microns |

Having illustrated a method and means for passive Q-switching and mode-locking lasers to produce repetitive, high rate repetition pulses of coherent radiation, while maintaining the same average power in a CW mode of operation, for laser transmission and illumination of signs, targets and the like, in accordance with the constitutional grant and Patent Statute, it will be apparent that some modification and variations may be made within the scope of this disclosure without departing from the spirit and embodiment thereof. The specific embodiments described are given by way of examples illustrative of my invention, discovery, or improvement, as embodied in the claims.

What is claimed is:

1. A Q- switching, mode locking gas laser system comprising:
   a. Two reflector means defining an optical resonant cavity having an optical axis,
   b. a gas laser amplifier containing $CO_2$ as the active laser gas positioned within and along said optical axis for generating a laser beam at a preselected wavelength, and
   c. cell means, positioned between said amplifier and at least one of said reflector means along said optical axis, and containing a mixture of selective $CO_2$ laser beam transmitting sulfur hexafluoride gas and $CO_2$ laser beam absorbent suppressor chlorotrifluoroethylene gas, for providing passive Q-switching and mode locking of said laser beam at said preselected wavelength and for suppressing oscillations at unwanted wavelengths.

2. A laser beam transmitting means placed in the beam transmission path of a laser beam consisting of a beam-transmitting cell containing a mixture of selective laser beam transmitting sulfur hexafluoride gas and laser beam absorbent suppressor gas chlorotrifluoroethylene.

* * * * *

PO-1050
(5/69)

UNITED STATES PATENT OFFICE
CERTIFICATE OF CORRECTION

Patent No. 3,638,137          Dated January 25, 1972

Inventor(s) William F. Krupke

It is certified that error appears in the above-identified patent and that said Letters Patent are hereby corrected as shown below:

Col. 1, line 55, "ensures" should be --ensues--.
Col. 2, line 66, "00°1 → 02° R-branch at 9.2 microns" should be --00°1 → 02°0 R-branch at 9.2 microns--;
Col. 2, line 72, after "00°1" insert --→--.
Col. 4, line 17, "P-branch 00°01→02°0 9.6 microns" should be --P-branch 00°1→ 02°0 9.6 microns--.

Signed and sealed this 27th day of February 1973.

(SEAL)
Attest:

EDWARD M. FLETCHER, JR.          ROBERT GOTTSCHALK
Attesting Officer          Commissioner of Patents